United States Patent
Westby (10) Patent No.: US 7,359,397 B2
(45) Date of Patent: Apr. 15, 2008

(54) PRIORITIZING TRANSFERS ACROSS AN INTERFACE

(75) Inventor: Judy L. Westby, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 981 days.

(21) Appl. No.: 10/294,008

(22) Filed: Nov. 12, 2002

(65) Prior Publication Data

US 2003/0198238 A1   Oct. 23, 2003

Related U.S. Application Data

(60) Provisional application No. 60/373,941, filed on Apr. 19, 2002.

(51) Int. Cl.
    *H04L 12/28* (2006.01)
(52) U.S. Cl. ............................... 370/412; 370/419
(58) Field of Classification Search ............... None
    See application file for complete search history.

(56) References Cited

U.S. PATENT DOCUMENTS

| | | |
|---|---|---|
| 5,748,924 A | 5/1998 | Llorens et al. |
| 5,768,530 A | 6/1998 | Sandorfi |
| 5,784,370 A | 7/1998 | Rich |
| 6,098,125 A | 8/2000 | Fiacco et al. |
| 6,145,024 A | 11/2000 | Maezawa et al. |
| 6,185,203 B1 | 2/2001 | Berman |
| 6,205,141 B1 | 3/2001 | Arroyo |
| 6,304,910 B1 | 10/2001 | Roach et al. |
| 6,310,910 B1 | 10/2001 | Shah et al. |
| 6,330,591 B1 | 12/2001 | Ducaroir et al. |
| 6,404,752 B1 | 6/2002 | Allen, Jr. et al. |
| 6,421,745 B1 | 7/2002 | James et al. |
| 6,425,034 B1 | 7/2002 | Steinmetz et al. |
| 6,484,236 B2* | 11/2002 | Fujimoto et al. ............ 711/114 |
| 6,505,268 B1* | 1/2003 | Schultz et al. ................. 711/4 |
| 6,718,447 B2* | 4/2004 | Cochran ...................... 711/162 |
| 6,851,020 B2* | 2/2005 | Matsumoto et al. ......... 711/112 |
| 2003/0021239 A1* | 1/2003 | Mullendore et al. ......... 370/276 |
| 2004/0059958 A1* | 3/2004 | Umberger et al. ............. 714/5 |
| 2004/0117438 A1* | 6/2004 | Considine et al. .......... 709/203 |
| 2004/0133624 A1* | 7/2004 | Park .......................... 709/200 |
| 2005/0251500 A1* | 11/2005 | Vahalia et al. ................. 707/1 |

\* cited by examiner

*Primary Examiner*—Andrew C. Lee
(74) *Attorney, Agent, or Firm*—Fellers, Snider, et al.

(57) ABSTRACT

Method and apparatus for prioritizing outbound data transfers across a serial data transmission interface to a connected device. An interface circuit includes a memory block in which outbound frames are temporarily stored pending transfer to the connected device, the outbound frames characterized as single frames having a command word payload and data frames which include a user data payload. A port successively establishes connections with corresponding ports of the connected device in response to connection requests associated with the outbound frames in the memory block. A prioritization circuit places single frame connection requests into a first queue and data frame connection requests into a second queue. Single frame connection requests are further placed into the second queue when the port fails to establish a successful connection. The connection requests in the first queue are forwarded to the port before the connection requests in the second queue.

17 Claims, 5 Drawing Sheets

PRIORITIZING TRANSFERS ACROSS AN INTERFACE

RELATED APPLICATIONS

This application claims domestic priority under 35 U.S.C. §119(e) to U.S. Provisional Application No. 60/373,941 filed Apr. 19, 2002.

FIELD OF THE INVENTION

The claimed invention relates generally to computer networks and more particularly, but not by way of limitation, to an improved approach to prioritizing the transfer of outbound frames across a serial interface such as Fibre Channel.

BACKGROUND

Fibre Channel is an American National Standards Institute (ANSI) set of standards directed to a high performance serial transmission protocol. Generally, Fibre Channel merges the advantages of channel technology with network technology to provide an input/output (I/O) interface which meets the requirements of both channel and network users.

Fibre Channel provides several important advantages over prior art interface schemes. Fibre channel provides high transmission bandwidths (presently up to about 4 gigabits ($10^{12}$) per second), which significantly improves computer-to-computer and computer-to-data storage device transfers. Fibre Channel utilizes fiber optic technology, which significantly expands possible interconnect distances between devices (up to about six miles), reduces noise and simplifies cabling requirements. Fibre Channel is also high level protocol independent, which allows a number of different protocols to be concurrently supported over the same network.

Serial data transfers using Fibre Channel are carried out in the form of frames. A command request from an initiator device to a target device for user data will typically result in the transmission of multiple, successive data frames from the target device, with the user data provided in the payload portions of the frames. Devices also transmit status frames, which are typically single frames with multiple status words as the payload. Among other uses, status frames are typically appended to the end of a data frame transmission to indicate the completion of the data transfer event.

While Fibre Channel represents a significant improvement in the transmission of computerized data, there remains a continual need for further improvements in the art with regard to the sorting and prioritizing of multiple pending frame transfers in a Fibre Channel or other serial interface environment. It is to such improvements that the claimed invention is directed.

SUMMARY OF THE INVENTION

In accordance with preferred embodiments, a data storage device is provided with an interface circuit which prioritizes outbound data transfers across a serial data transmission interface to a connected device.

The interface circuit includes a memory block in which outbound frames are temporarily stored pending transfer to the connected device, the outbound frames characterized as single frames having payloads comprising control or status words and data frames which include a user data payload.

A port successively establishes connections with corresponding ports of the connected device in response to connection requests associated with the outbound frames in the memory block.

A prioritization circuit places single frame connection requests into a first queue and data frame connection requests into a second queue. Single frame connection requests are further placed into the second queue in the event the transfer fails after the attempted connection. The connection requests in the first queue are forwarded to the port before the connection requests in the second queue. In this way, an optimal balance is reached between the outputting of single frame control and status and user data in an easily implemented, efficient fashion.

The prioritization circuit further preferably operates to prioritize the outputting of frames when another device establishes a connection with the local port.

These and various other features and advantages which characterize the claimed invention will become apparent upon reading the following detailed description and upon reviewing the associated drawings.

DETAILED DESCRIPTION

Figure 1:
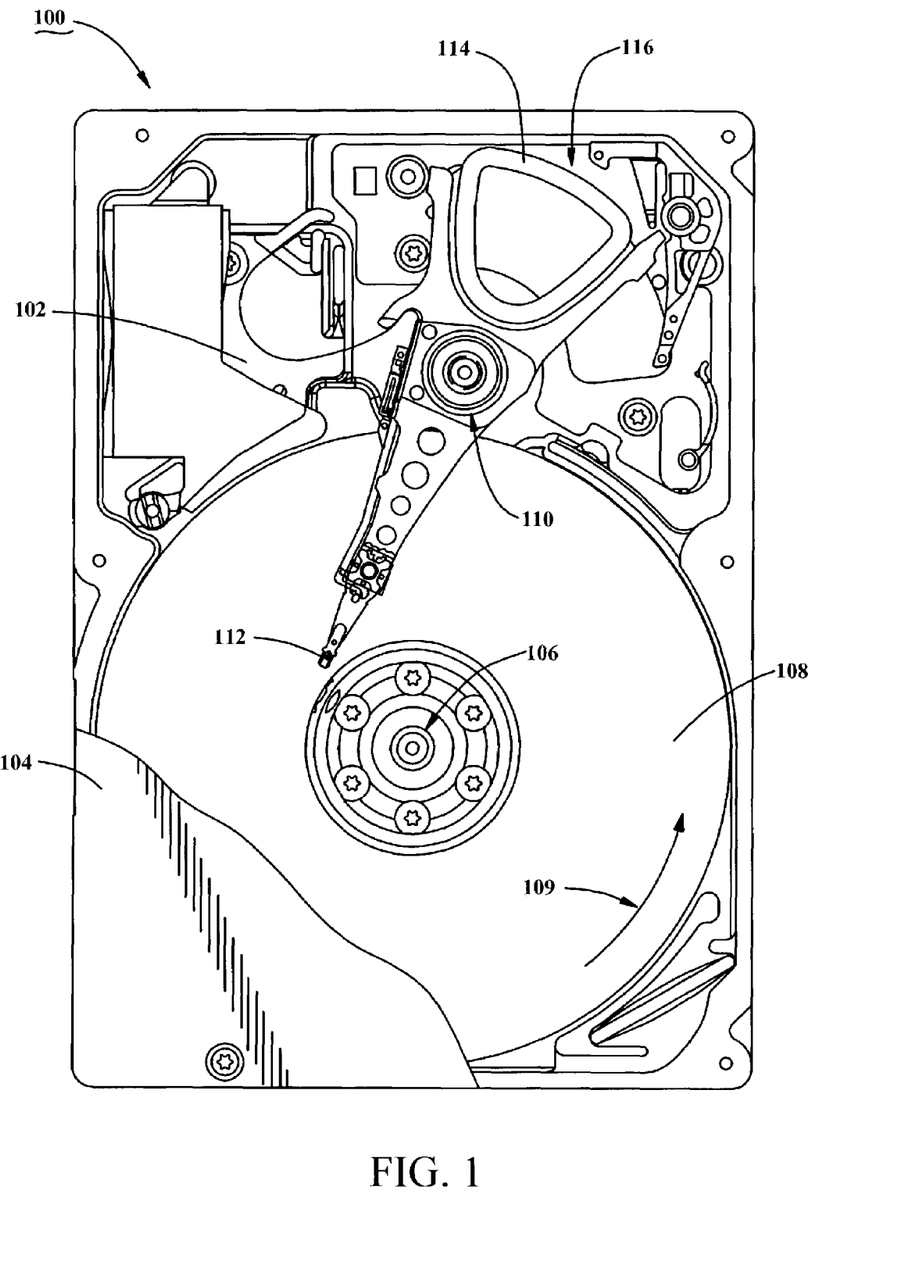
FIG. 1 is a top plan view of a disc drive data storage device constructed in accordance with preferred embodiments of the present invention.

To provide an environment in which preferred embodiments of the claimed invention can be advantageously practiced, the present discussion begins with FIG. 1 which shows a disc drive data storage device 100 (disc drive). The disc drive 100 is preferably configured to store user data from and retrieve user data to a connected device over a Fibre Channel serial interface, although other serial interfaces can readily be used.

A base deck 102 and top cover 104 cooperate to form a sealed housing. A spindle motor 106 mounted within the housing rotates a number of magnetic recording discs 108 in direction 109. An actuator 110 supports a corresponding number of data transducing heads 112 adjacent tracks defined on the recording surfaces of the discs 108. The actuator 110 pivots in response to the application of current to a coil 114 of a voice coil motor (VCM) 116 to position the heads 112 to write data to and read data from data sectors on the tracks.

Figure 2:
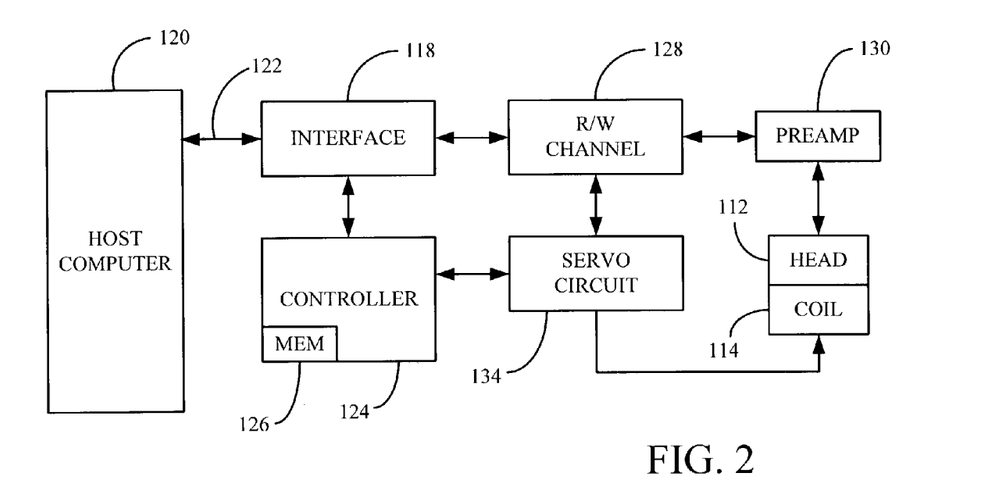
FIG. 2 provides a functional block diagram of communication and control electronics of the disc drive.

FIG. 2 provides a simplified functional block diagram of communication and control electronics of the disc drive 100.

The electronics are supported on a disc drive printed circuit board (PCB) mounted to the underside of the base deck 102. An interface circuit 118 communicates with a host computer 120 via a Fibre Channel serial interface path 122. The path 122 provides a point-to-point (dedicated) connection between the respective devices. A programmable controller 124 with associated memory 126 provides top level control of data transfer operations.

A communication (read/write) channel 128 encodes and serializes data to be stored to the discs 108 during write operations and applies signal processing techniques to reconstruct data from the discs 108 during read operations. A preamplifier/driver circuit 130 (preamp) applies write currents to the selected head 112 and preamplification to readback signals from the selected head 112. A servo circuit 134 provides closed loop positional control of the actuator 110.

Figure 3:
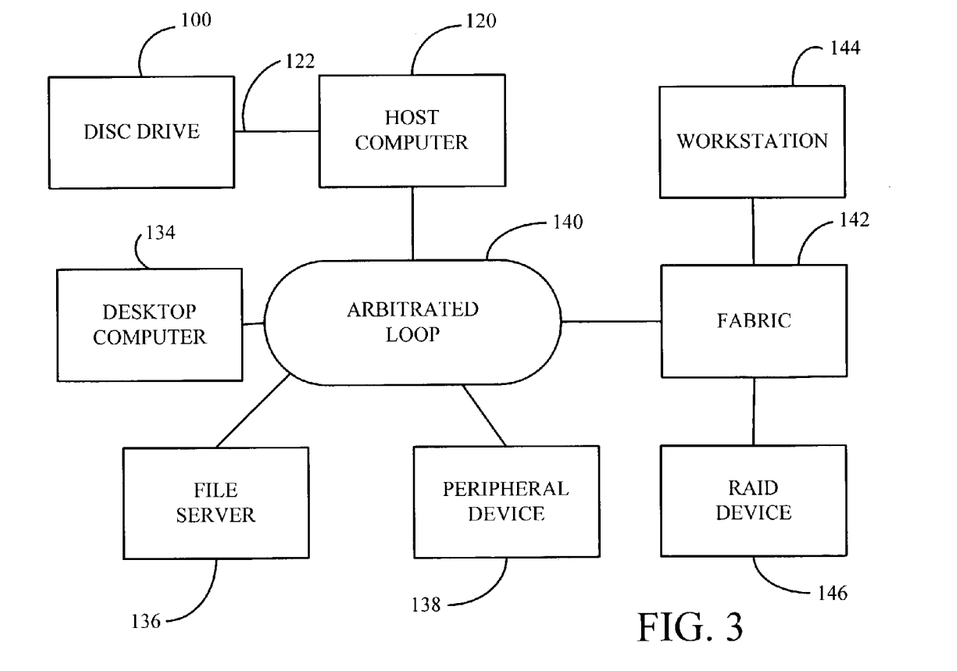
FIG. 3 provides a functional block diagram of a representative Fibre Channel network.

FIG. 3 provides a functional block diagram of a representative Fibre Channel network to illustrate different topologies in which the claimed invention can be utilized. The host device 120 is connected to a number of local devices including a desktop computer 134, a file server 136 and a peripheral device (such as a printer) 138 via an arbitrated loop 140. Transfer requests from the different devices within the loop 140 are sequentially serviced using a round-robin approach.

The loop 140 is attached to a fabric 142 which interconnects a number of devices such as a workstation 144 and a redundant array of independent discs (RAID) device 146. The fabric 142, also characterized as a switch or router, routes transmissions to and from the various connected devices. While FIG. 3 shows the interconnection between the host computer 120 and the disc drive 100 to be point-to-point, it will be recognized that drives can be readily configured to communicate with other devices using an arbitrated loop or fabric connection.

Transfers between the respective devices in FIG. 3 take place in the form of frames, which are the smallest indivisible quantum of data sent over the interface.

Figure 4:
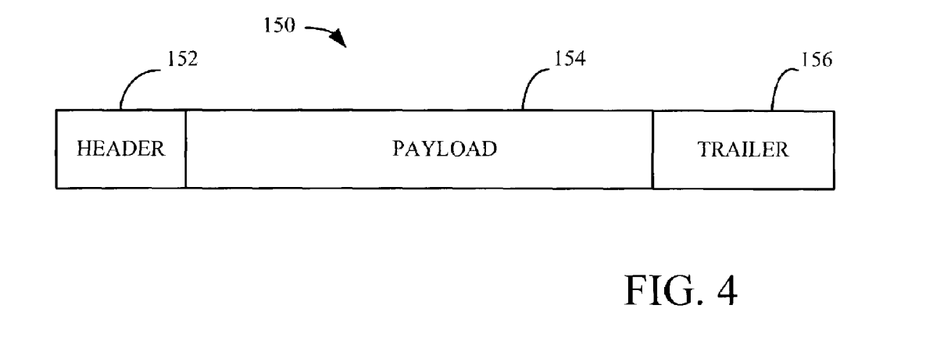
FIG. 4 illustrates the general format for a frame.

FIG. 4 shows a generalized format for a frame 150. Each frame 150 includes a header portion 152 (leading delimiter with address, content and priority level information), a data payload portion 154 (user data or command/status word) and a trailing portion 156 (delimiter with error correction and other information). Transmissions are typically full-duplex, in that ports of the respective devices have the capability of both simultaneously transmitting and receiving data.

A write-type transaction generally involves the transfer of data from an initiator device to a target device, such as when a data file from the host computer 120 is saved to the disc drive 100. The initiator device issues a request to transfer data to the target device via a single frame command frame by establishing a port-to-port connection.

The target device responses with a single status frame (Transfer Ready frame) when it is ready to accept the data. After establishing a port-to-port connection, the data to be written are transmitted in a sequence of data frames to the target device. The target device responds with a command complete status frame to indicate the intended action by the target device has been completed.

A read-type transaction generally involves the transmission of data from the target device to the initiator device, such as when a data file stored on the disc drive 100 is requested by an application running on the host computer 120. The initiator device issues a request for the target data via a single frame command frame.

The target device performs the necessary retrieval actions to accumulate the requested data, encodes and formats the data into a number of data frames, and issues a connection request to the initiator device. The data frames are then transmitted across the interface as before. The target device responds with a command complete status frame to indicate the intended action by the target device has been completed.

Figure 5:
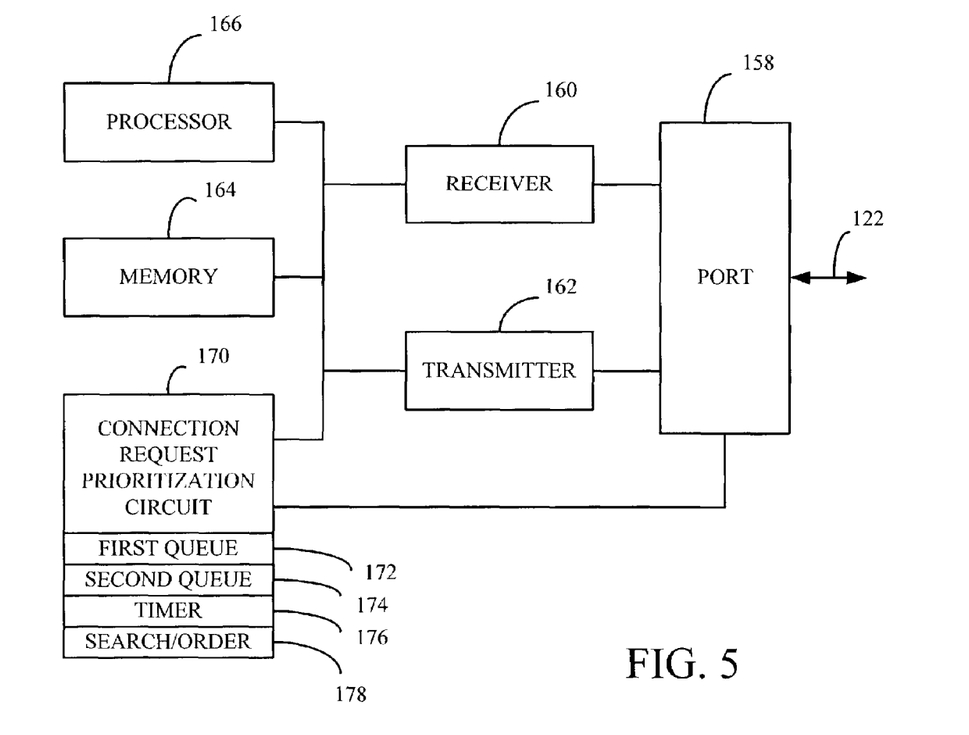
FIG. 5 is a functional block diagram of interface circuitry utilized in the network of FIG. 3 in accordance with preferred embodiments of the present invention.

FIG. 5 provides a functional block diagram of relevant portions of the interface circuit 118 (FIG. 2) of the disc drive 100. It is contemplated that the interface circuit 118 includes one or more nominally identical sets of the circuitry shown in FIG. 5 which concurrently operate in parallel, but only one set has been shown for clarity. The circuitry of FIG. 5 is further preferably realized in the other Fibre Channel devices shown in FIG. 3.

A full-duplex port 158 communicates across the Fibre Channel serial path 122 with corresponding ports of the host computer 120. A receiver block 160 processes incoming data frames and a transmitter block 162 processes outgoing data frames. Frames are temporarily buffered in memory block 164 (which can be one or more devices including on-chip static random access memory, SRAM, separate dynamic random access memory, DRAM, a first-in-first out register, off-chip memory, etc.). A hardware or programmable processor 166 assembles the appropriate delimiter fields 152, 156 (FIG. 4) for outbound frames pending transmission.

Of particular interest is a connection request prioritization circuit 170 which operates to sort and prioritize pending connection requests for the port 158. The prioritization circuit 170 improves the utilization of the interface by establishing a dynamic balance between transfer requests involving command frames and transfer requests associated with data frames.

The prioritization circuit 170 includes a first queue 172, a second queue 174, a timer circuit 176 and a search and ordering circuit 178. As discussed below, the queues 172, 174 operate to sort and prioritize connection requests, the timer circuit 176 provides timing functions and the search and ordering circuit 178 advances and reorders pending requests within the queues 172, 174 under various circumstances. The prioritization circuit 170 is preferably realized in hardware.

Figure 6:
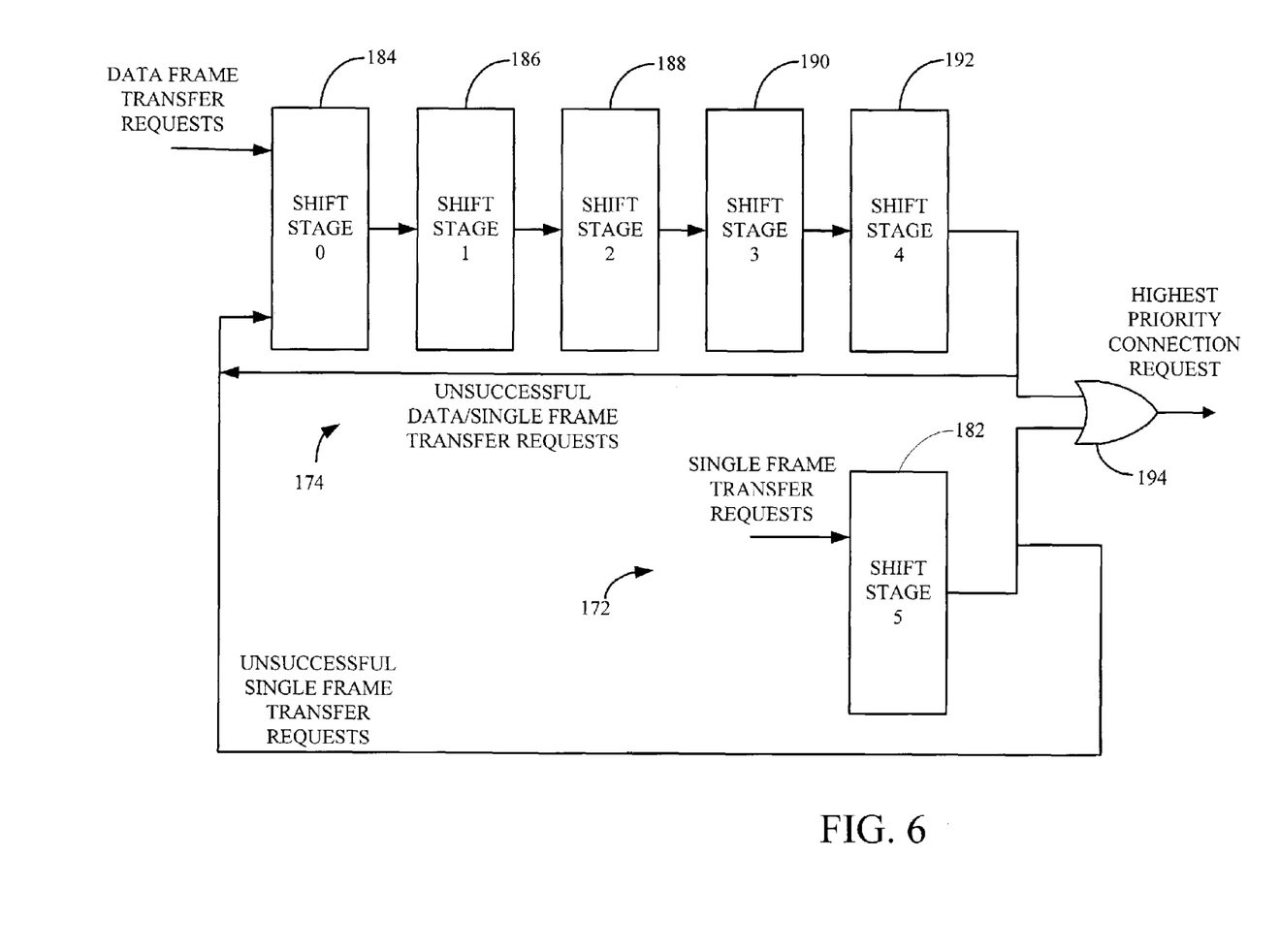
FIG. 6 illustrates the first and second queues of the prioritization circuit of FIG. 4.

FIG. 6 shows the first and second queues 172, 174 of the prioritization circuit in greater detail. Connection requests associated with the frames in the memory block 164 are loaded into the respective queues 172, 174 as the frames are accumulated. The first queue 172 comprises a single shift register 182 (shift stage 5), and is dedicated to single frame transfers; that is transfers that involve a single frame in which the payload comprises control or status words (such as responses in target mode, commands in initiator mode, etc).

The second queue 174 includes shift registers 184, 186, 188, 190 and 192 (shift stages 0-4) and is primarily dedicated to data frame transfers; that is, frame transmissions in which the payload comprises user data. While the respective queues 172, 174 utilize a 1:5 ratio, other respective numbers of stages can be used. Shift stage 0 (184) represents the lowest priority stage and shift stage 5 (182) represents the highest priority stage.

As shown in FIG. 6, the second queue 174 also accommodates single frame connection requests from the first queue 172 that could not be completed successfully. This occurs when the port to which the single frame is directed to cannot be connected to or can be connected to but cannot accept the frame. This reordering allows other transfers to continue while the other destination port is unavailable.

In a preferred embodiment, shift stage 0 is reserved for unsuccessful single frame or unsuccessful data transfers from the first queue 172. Data frame transfers are loaded into shift stage 0 and then shifted into stages 1-4, but are generally not allowed to occupy shift stage 0. Thus, in this embodiment unsuccessful single or data frame transfer requests go to the end of the line in the second queue 174, although other configurations are readily envisioned.

It is generally desirable to give priority to single frame transfers over data transfers to allow commands that are almost complete to finish so that the next command can be serviced. This reduces overall command overhead. Also, by having multiple commands in process at the same time, there may be more opportunities to transfer when a connection has been established on the interface. Generally, single frame transfers take less time to complete than multi-frame data transfers. At the same time, simply giving absolute priority to all single frame transfers regardless of the relative mix of command and data transfers can be suboptimum with regard to overall transfer performance.

Thus, as requests to transmit are received, associated connection requests are loaded into and advance through the respective queues 172, 174. In general, data transfers are serviced in the order that the requests are received. As long as a location in the second queue 174 is not occupied, the request continues to shift to a higher priority position. A forwarding block (represented by OR gate 194) defers to the connection requests in the first queue 172 over the highest priority data transfer in the second queue 174. The winning connection request is forwarded to the port 158 which processes the connection request in a conventional manner.

For serial interfaces with multi-initiator capability, the data and single frame transfers can be for the same destination or for different destinations. If a non-arbitration scheme is utilized (i.e., the destination port must be identified before requesting access to form a connection), the highest priority entry in the shift register determines to which port the connection will be attempted. In an arbitration scheme, the port 158 requests access to establish a connection, but waits until access is granted before deciding which port should be selected for the connection. This can allow a single frame transfer to be chosen even if it was not pending at the time the connection was requested. Also, while the connection is open, other transfer requests may be generated for the destination port and these can be serviced as well in the same connection event.

It is contemplated that the port 158 may be opened by another port from a separate device while the port 158 itself is requesting a connection, and the highest priority entry in the queues 172, 174 may not be for the other port. In such a case, the prioritization circuit preferably searches the queues 172, 174 for any requests pending for the other port, and service such while the connection remains established. The shift stages within the queues 172, 174 are used to select the highest priority request for the other port.

The prioritization circuit 170 further compensates for requested connections that are attempted but not completed because the destination port could not successfully accept the requested transfer. Connection requests in the first queue 172 that fail to result in a successful connection are moved to the second queue 174 (shift stage 0). If no other requests are pending in the second queue 174, the connection request is immediately retried. Similarly, unsuccessful connection requests from the second queue 174 are moved from shift stage 4 to shift stage 0 (placed at the back of the line). Timing for such reordering of requests can be predicated on timeouts across the interface or shorter time periods set by the timer 176. Further reordering can be easily effected to find a connection request for a different port if a particular port is busy.

Once a request has been serviced, it is removed from the queues 172, 174. Unserviced requests can also be cancelled and removed from the queues 172, 174 when a destination port is determined to be permanently offline.

Figure 7:
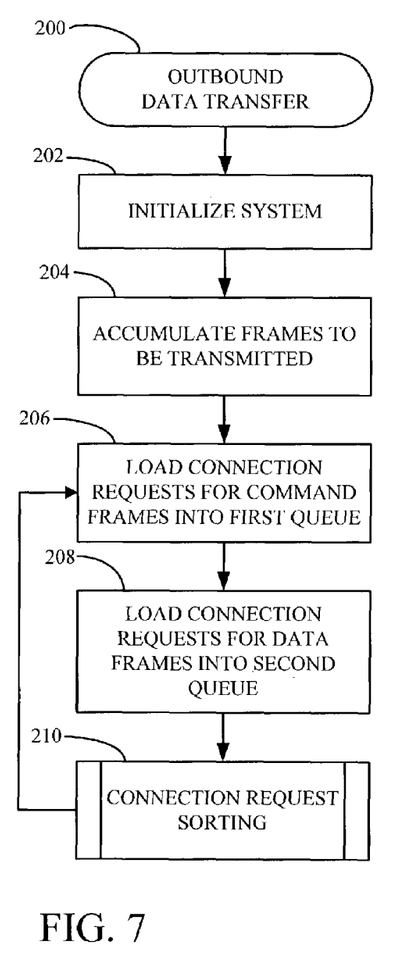
FIG. 7 is a flow chart for an OUTBOUND DATA TRANSFER routine, illustrative of steps carried out in accordance with preferred embodiments to prioritize outbound data transfers across the interface.

FIG. 7 provides a flow chart for an OUTBOUND DATA TRANSFER routine 200 to summarize operation of the interface circuit 118 in accordance with the foregoing discussion. After system initialization at step 202, online operation begins at step 204 during which full-duplex transfers occur between the port 158 and the ports of the host computer 120. Frames to be transmitted to the host computer 120 (such as in response to data request commands from the host) are assembled and accumulated in the memory block 164 pending transfer.

As shown by step 206, as single frames are accumulated in the memory 164, the prioritization circuit 170 loads connection requests associated with the single frames into the first queue 172. Likewise, as each new set of data frames are accumulated in the memory 164, as represented by step 208 an associated connection request is loaded into the second queue 174. It will be understood that steps 204, 206 and 208 are continuous operations that will continue to run so long as outbound frames are placed into the memory 164.

While it is contemplated that the lengths of the respective queues 172, 174 shown in FIG. 6 will be sufficient to handle the existing quantity of queued outbound transfers, the prioritization circuit 170 can further be configured to delay introduction (on a first in, first out basis) of connection requests into the queues 172, 174 until room becomes available in the queues.

Once at least one connection request has been loaded into the queues 172, 174, the routine continues to step 210 wherein a connection request sorting routine takes place. This operation is set forth by the flow of FIG. 8.

Figure 8:
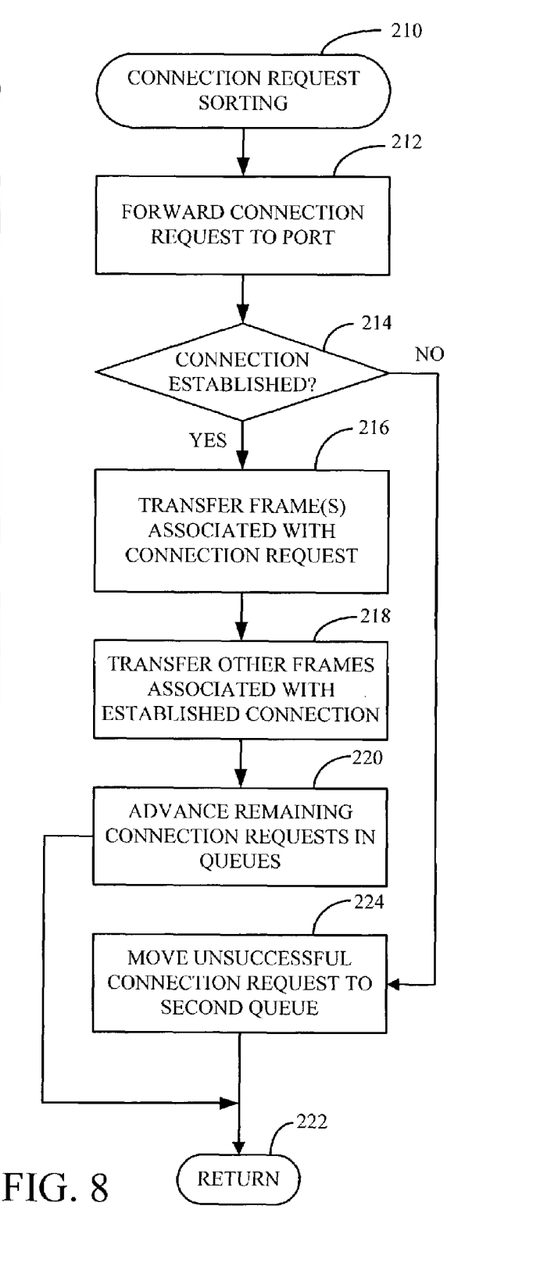
FIG. 8 is a flow chart for a CONNECTION REQUEST SORTING routine, which is performed as a subroutine of FIG. 7.

At step 212, the highest priority connection request in the queues 172, 174 is forwarded to the port 158. The port 158 proceeds to attempt to establish a connection with the port associated with the winning connection request. If a connection is successfully established, as shown by decision step 214 the flow continues to step 216 where the frame(s) associated with the winning connection request are transmitted across the interface path 122 (from memory 164, through transmitter block 162 and through port 158, as shown in FIG. 5).

While the frames are being transmitted, the search/order circuit 178 preferably searches for other pending transfers associated with the opened port and proceeds to coordinate the transfer of these frames as well while the connection remains open, as indicated by step 218. The winning connection request is removed from the queues 172, 174 when the transfer associated with the connection request is completed and the remaining connection requests are advanced to the next highest available stage, step 220. The flow then returns to FIG. 7 as shown by return step 222.

Returning to the decision step 214, at such times that the desired port is busy or otherwise unavailable, the flow passes to step 224 wherein the unsuccessful connection request (i.e., the most recently attempted request) is moved to the second queue 174 and the routine returns at step 222 for a new pass.

The prioritization circuit provides several important advantages over the prior art. Sorting and prioritizing the pending outbound transfers (instead of simply using a first-in, first-out approach) improves the efficiency and throughput of the interface. The use of high speed queues as shown in FIG. 6 provides a simple and easily implemented solution that does not require complex sorting algorithms to be enacted, resulting in reduced processing overhead.

Another advantage is the balance provided between data frames and single frames by simple selection of the respective numbers of stages in the queues 172, 174, along with the implementation of other simple rules such as advancement of other transfers based on existing connections. While in a preferred embodiment the respective numbers of stages are fixed, it is contemplated that in alternative preferred embodiments the relative mix of data and single frame transfers can be monitored and additional stages can be switched in adaptively as desired.

It will now be appreciated that the present invention (as embodied herein and as claimed below is generally directed to a method and apparatus for prioritizing outbound data transfers across a serial data transmission interface to a connected device.

In accordance with a first aspect, a prioritization circuit (such as 170) includes a first queue (such as 172) having a first number of serially connected stages (such as 182) and a second queue (such as 174) connected in parallel to the first queue and having a second, larger number of serially connected stages (such as 184, 186, 188, 190).

During operation, connection requests associated with single frames in which control, response, or status data are to be transmitted by a port (such as 158) are loaded into and advance through the first queue and connection requests associated with user data frames in which user data are to be transmitted by the port are loaded into and advance through the second queue. The port services the connection requests pending in the first queue before servicing the connection requests pending in the second queue. Preferably, the first queue includes a single stage and the second queue has at least four serially connected stages.

In accordance with another aspect, an interface circuit (such as 118) is provided for use in a data storage device (such as 100), comprising a memory block (such as 164) in which outbound frames are temporarily stored pending transfer to the connected device, the outbound frames characterized as single frames which include control, response or status data words within the payload and data frames which include a user data payload. A port (such as 158) successively establishes connections with corresponding ports of the connected device in response to connection requests associated with the outbound frames in the memory block.

A prioritization circuit (such as 170) sequentially provides the connection requests to the port in turn by placing the connection requests associated with the single frames in the memory block into a first queue (such as 172) and placing the connection requests associated with the data frames in the memory block into a second queue (such as 174). The prioritization circuit forwards the connection requests in the first queue to the port before forwarding the connection requests in the second queue to the port.

In another aspect, the method preferably includes steps of accumulating frames in a memory block pending transfer to the connected device, the outbound frames characterized as single frames which include control, response or status data within the payload and data frames which include a user data payload (such as by step 204). Connection requests associated with the single frames are loaded into a first queue (such as by step 206), and connection requests associated with the user data frames are loaded into a second queue (such as by step 208).

The connection requests in the first and second queues are sequentially output to a port (such as by step 210), wherein the first queue is emptied before the connection requests in the second queue are provided to the port. The port attempts to establish a connection across the interface to a selected destination port of the connected device in response to receipt of each connection request in turn (such as by step 212).

For purposes of the appended claims, "user data frames" will be understood consistent with the foregoing discussion to describe frames in which the payload (such as 154, FIG. 4) comprises user data requested by an initiator device (either in a read or write context). "Single frames" will be understood to describe frames in which the payload comprises one or more command words. "Command words" are defined as control, response and/or status data and expressly exclude user data. Examples of single frames in this context include initiator frames that provide control functions and response frames which provide status information. Single frames further include other types of control frames such as Link Services frames, FCP frames, etc.

The particular types of single frames will of course depend upon the configuration and use of a given interface. Thus, the dividing line can readily be demarked between user data frames as frames which transmit user data and single frames which transmit data other than user data.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

In addition, although embodiments described herein are directed to a prioritization circuit for use in a Fibre Channel serial interface of a disc drive data storage device, it will be appreciated that the circuit can be readily used in other types of Fibre Channel devices as well as in devices that utilize other serial interfaces, such as but not limited to Serial Attached SCSI (SAS) without departing from the spirit and scope of the claimed invention.

What is claimed is:

1. An apparatus comprising a prioritization circuit which sequentially provides connection requests to a port by placing connection requests associated with single frames in a first queue and placing connection requests associated with data frames into a second queue, wherein the prioritization circuit forwards the connection requests in the first queue to the port before forwarding the connection requests in the second queue to the port, and wherein a total number of stages in the first queue equals one.

2. The apparatus of claim 1, wherein a total number of stages in the second queue is at least two.

3. The apparatus of claim 1, wherein during operation unsuccessful connection requests from the first queue are loaded into the second queue for subsequent servicing by the port.

4. The apparatus of claim 1, further comprising a search and ordering circuit which, when a connection is established with a destination port for a selected connection request, searches the first and second queues for other pending connection requests associated with the destination port and coordinates the transfer of the frames associated with the other pending connection requests associated with the destination port while the connection remains established.

5. The apparatus of claim 1, wherein the port transmits across a serial data transmission interface.

6. An apparatus comprising:
a port which successively establishes connections across an interface in response to connection requests associated with outbound frames; and
a prioritization circuit which sequentially provides the connection requests to the port in turn by placing connection requests associated with single frames into a first queue having a first number of stages and placing connection requests associated with data frames into a second queue having a second number of stages greater than the first number, wherein the prioritization circuit forwards the connection requests in the first queue to the port before forwarding the connection requests in the second queue to the port.

7. The apparatus of claim 6, wherein the first queue is configured to hold a single connection request at a time.

8. The apparatus of claim 6, wherein during operation unsuccessful connection requests from the first queue are loaded into the second queue for subsequent servicing by the port.

9. The apparatus of claim 6, wherein the second queue is configured to hold up to at least two connection requests at a time.

10. The apparatus of claim 6, wherein the prioritization circuit further comprises a search and ordering circuit which, when a connection is established with the destination port for a selected connection request, searches the first and second queues for other pending connection requests associated with the destination port and coordinates the transfer of the frames associated with the other pending connection requests associated with the destination port while the connection remains established.

11. The apparatus of claim 6, wherein the interface comprises a Fibre Channel interface.

12. A method comprising:
loading a connection request associated with a single frame into a first queue;
loading connection requests associated with data frames into a second queue;
sequentially outputting the connection requests in the first and second queues to a port which attempts to establish a connection across an interface to a selected destination port in response to receipt of each connection request in and
initiating a timer to measure a predetermined elapsed time when a connection attempt is made by the port in response to receipt of a selected connection request, wherein the selected connection request is characterized as an unsuccessful connection request and moved to the second queue when the connection attempt has not succeeded at the end of the predetermined elapsed time.

13. The method of claim 12, wherein the first queue is configured to hold a single connection request at a time.

14. The method of claim 12, wherein the second queue is configured to hold up to at least two connection requests at a time.

15. The method of claim 12, further comprising:
establishing a connection with a selected destination port in response to a selected connection request;
searching the first and second queues for other pending connection requests associated with the selected destination port; and
transferring the frames associated with the other pending connection requests associated with the selected destination port while the connection remains established.

16. The method of claim 12, wherein the interface comprises a Fibre Channel interface.

17. The method of claim 12, wherein the first and second queues comprise shift registers with respective numbers of stages, wherein the number of stages in the second queue is larger than the number of stages in the first queue.

* * * * *

UNITED STATES PATENT AND TRADEMARK OFFICE
CERTIFICATE OF CORRECTION

PATENT NO. : 7,359,397 B2  
APPLICATION NO. : 10/294008  
DATED : April 15, 2008  
INVENTOR(S) : Judy L. Westby

Page 1 of 1

It is certified that error appears in the above-identified patent and that said Letters Patent is hereby corrected as shown below:

In Col. 10, line 10  
replace "request in and"  
with --request in turn; and--

Signed and Sealed this

First Day of July, 2008

JON W. DUDAS  
*Director of the United States Patent and Trademark Office*